Christopher E. Loeser   Inventor

By [signature]   Attorney

Christopher E. Loeser Inventor

Jan. 7, 1958 C. E. LOESER 2,818,891
APPARATUS FOR SUPPORTING AND MANIPULATING
FLEXIBLE CONDUIT CONNECTIONS
Filed Sept. 26, 1956 4 Sheets-Sheet 3

Christopher E. Loeser Inventor

By *George J. Silhavy* Attorney

United States Patent Office 2,818,891
Patented Jan. 7, 1958

2,818,891

APPARATUS FOR SUPPORTING AND MANIPULATING FLEXIBLE CONDUIT CONNECTIONS

Christopher E. Loeser, Scotch Plains, N. J., assignor to Esso Research and Engineering Company, a corporation of Delaware Application September 26, 1956, Serial No. 612,313

1 Claim. (Cl. 141—388)

The present invention relates to an apparatus for supporting and manipulating flexible conduit connections. More particularly, the invention relates to such apparatus for supporting and manipulating flexible conduit connections between a relatively fixed and rigid conduit system and a similar system carried on a platform which is disposed for vertical and horizontal movement with respect to the first conduit system and also arcuately with respect thereto. Specifically the invention relates to an apparatus for handling flexible hose connections between a substantially rigid and fixed conduit system as a part of a ship-loading, shore installation and the conduit system carried by a buoyant vessel such as a tank vessel or barge.

It is an object of the present invention to provide an apparatus for establishing and maintaining flexible conduit connections between two conduit systems wherein the flexible connecting members are secured at one end in substantially permanent relation to one of said conduit systems with the other ends of said conduit connections supported for limited movement vertically and horizontally, and to maintain said conduits in substantially coplanar alignment with each other and in connection to a second conduit system movable vertically, horizontally and arcuately with reference to the first conduit system.

Figure 1:
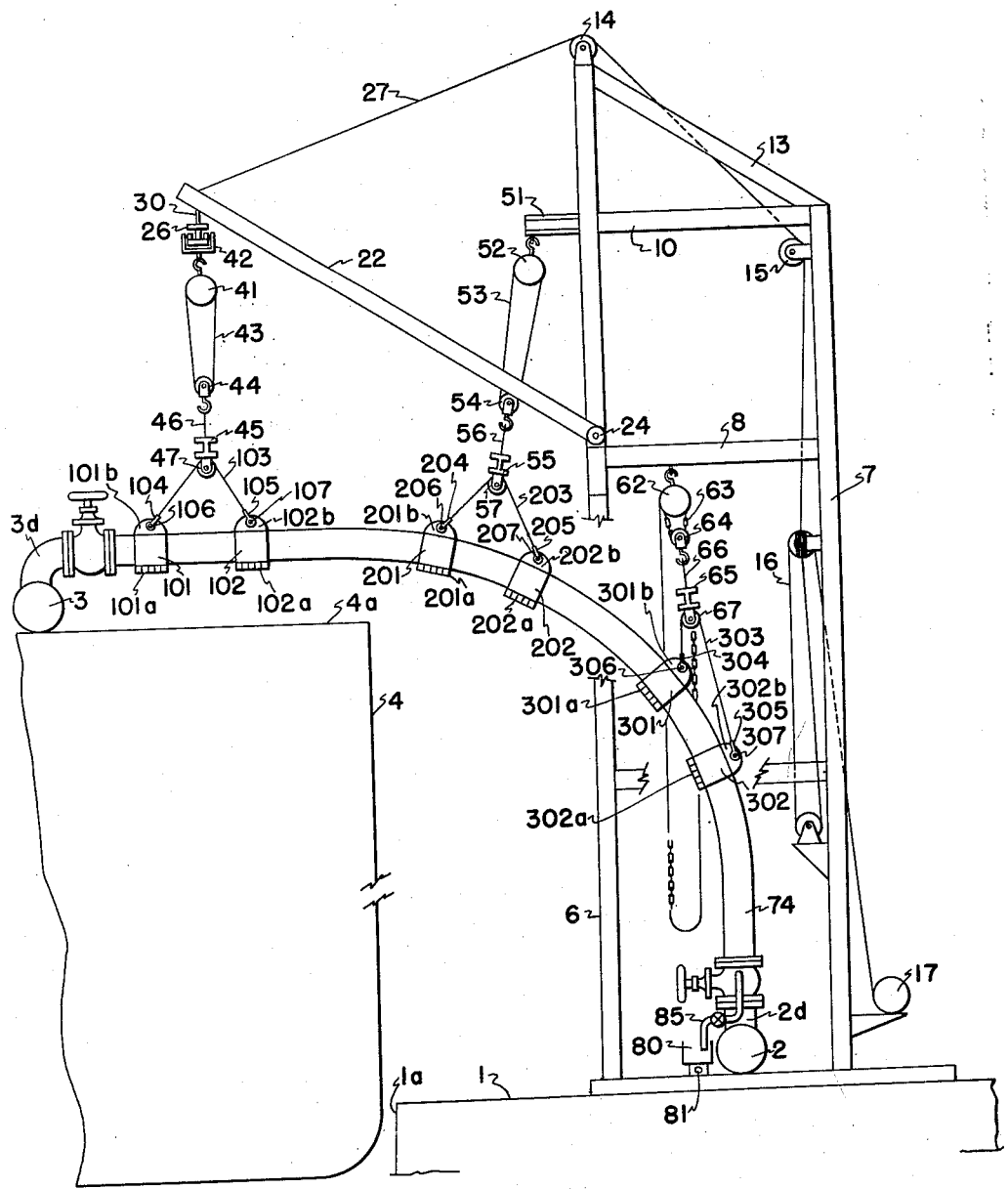

It is a further object of the invention to provide such means for support and manipulation of the flexible conduits as to permit elevation of the free ends thereof in a manner which will permit drainage of the flexible conduits. In addition, it is an object of the present invention to provide such means for support and manipulation wherein chafing, kinking or buckling of the flexible conduits are substantially avoided. The invention and its objects may be more fully understood from the following description when this is read with reference to the accompanying drawing in which:

Fig. 1 is a view in side elevation of a structure such as contemplated by the present invention, wherein the support and manipulation components are disposed to permit connection of flexible conduits, of which one is shown, between a fixed conduit system on a wharf or dock, and a movable conduit system and wherein the movable system is buoyantly supported on a tank vessel at a level considerably above that of the fixed conduit system.

Figure 1A:
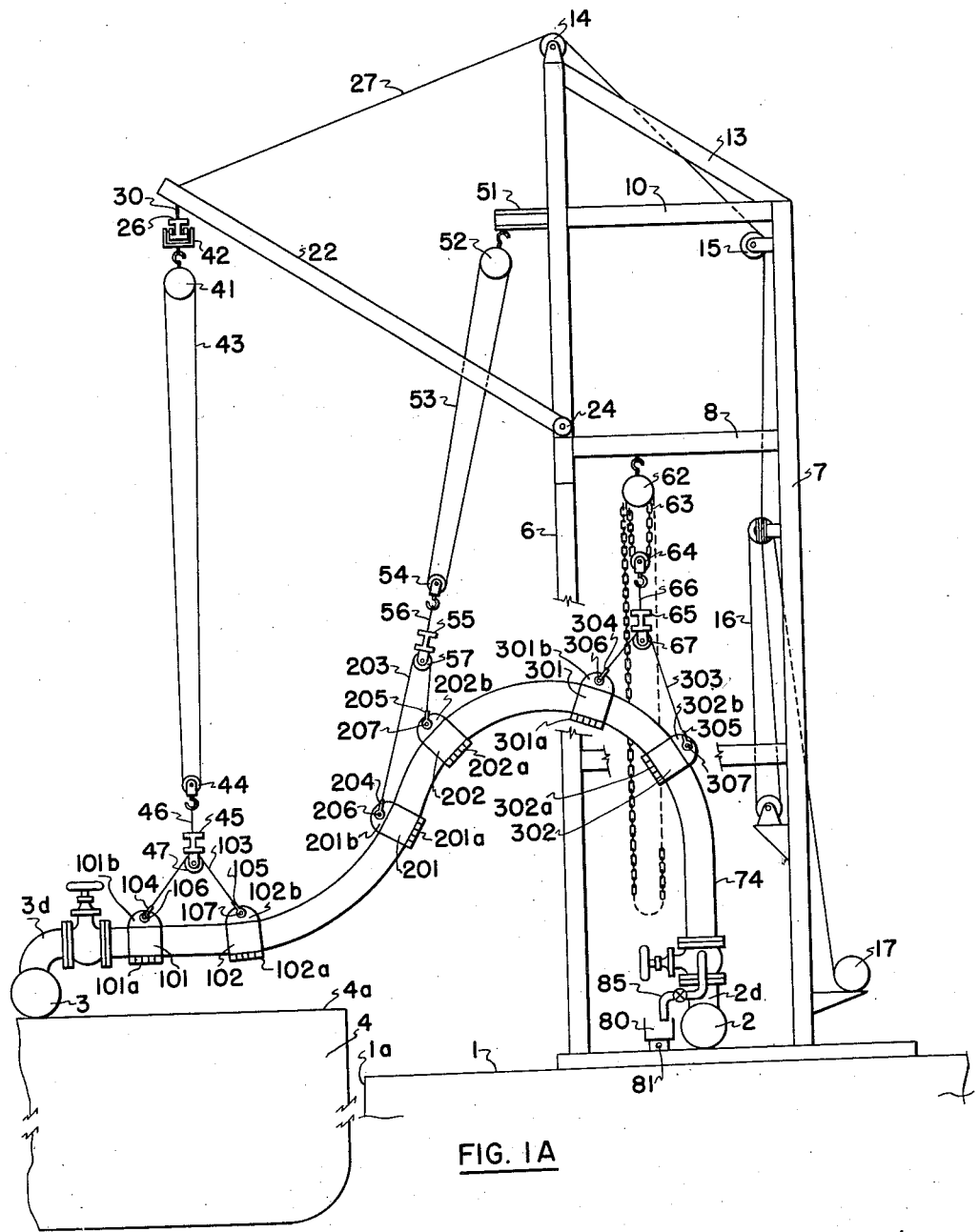

Fig. 1A is a similar view of the structure of Fig. 1, with the movable conduit system buoyantly supported at substantially the level of the fixed conduit system.

Figure 1B:
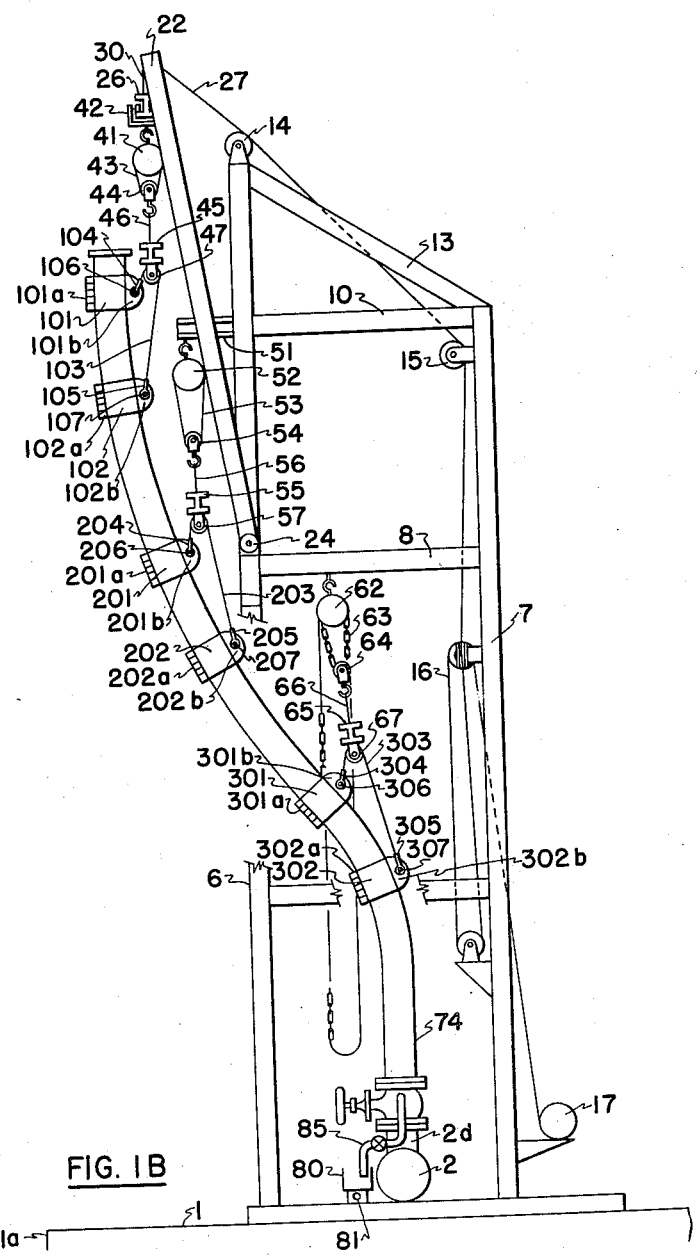
Figure 2:
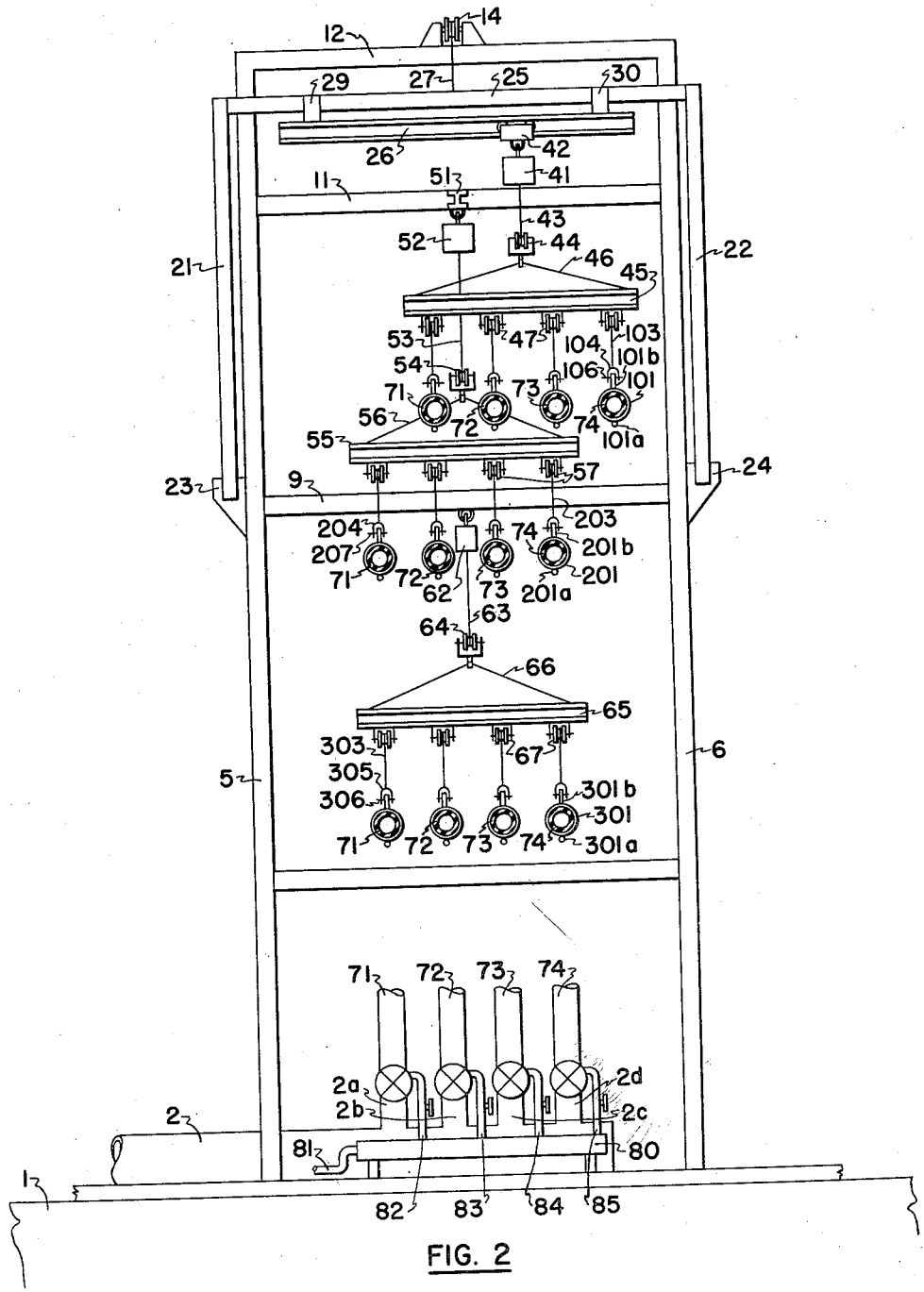

Fig. 1B is a similar view of the structure of Fig. 1, showing the flexible conduits as represented by the one conduit visible, disconnected from the movable second conduit system, and disposed in an extreme elevated position; and Fig. 2 is a view taken in front elevation of the apparatus as represented by Fig. 1 with the flexible conduit connections, vessel structure, and movable conduit system omitted for clarity.

In the drawings, the numeral 1 designates a base of the character provided by a typical jetty, wharf, or dock adapted for mooring, a tank vessel or barge, and including such facilities as required for loading and unloading a liquid cargo. Included in the installation, as shown, is a bulkhead 1a against which a vessel may be moored.

Mounted on the base 1 is a first, fixed conduit system. Conventionally this system may comprise either a series of separate conduits, each terminating in a valved end portion, or a single conduit provided with a series of valved branch connections thereto. In either event, the valved end portions or branch connections will be provided for connection to a second and similar conduit system, supported as on a tank vessel. As contemplated, the second conduit system is movable vertically, horizontally and arcuately with reference to the first, fixed conduit system. In the embodiment illustrated, such movement may be occasioned by the rise and fall of tidal waters, changes in vessel displacement as a result of loading and unloading operations, or by other conditions affecting vessel trim.

In the drawings, the fixed conduit system is represented as a single conduit 2 having a series of four valved branch connections 2a, 2b, 2c, and 2d. The movable conduit system is indicated in Figs. 1 and 1A by the numeral 3. A single branch connection 3d is shown in these figures. The tank vessel is represented schematically in the drawings, being designated by the numeral 4 therein. The vessel deck is indicated by the numeral 4a.

Also mounted on the base 1 is a tower structure. This tower may be of any suitable and conventional form within the limitations and requirements for its purpose as indicated from the following description. For example, the tower may have any desired cross-sectional conformation, triangular, rectangular or otherwise, so long as it presents to the water or mooring side of the base 1, a face which is substantially parallel to the base portion corresponding to the bulkhead 1a, and of a width somewhat greater than the length of that portion of the fixed conduit which includes the valved branch connections.

In the drawings, the tower is represented as being substantially square and includes two forward corner posts 5 and 6 disposed in a plane substantially parallel to the bulkhead 1a, and two rearward corner posts, of which one is shown and designated by the numeral 7 in Figs. 1, 1A, and 1B. Preferably, and as shown, the tower will be disposed so as to straddle the fixed conduit system, and also to provide a forward face between the corner posts 5 and 6 which is relatively free of structural members to a height somewhat above the normal upper limit of vertical and arcuate movement of the second movable conduit system with the vessel or barge.

Substantially at such normal upper limit, the tower provides a first tower stage portion which in the structure illustrated is at the level defined by horizontal cross frame members or beams disposed in substantially parallel relation to the base 1, and designated by the numerals 8 and 9. Similar cross frame members 10 and 11, establish and define a second tower stage portion spaced vertically above the level of the first stage. The corner posts 5 and 6 are extended upwardly beyond this second stage and joined thereabove by means of a cross frame member 12, shown in Fig. 2. These extended post portions are also joined in the second stage as to the post 7 by means of braces of which one is shown and designated by the numeral 13 in Fig. 1. A sheave 14 is supported by the cross frame member 12 midway thereof.

The numerals 21 and 22 designate corresponding parallel leg portions of a yoke boom. Each of these leg portions has an inner end pivotally supported on the tower substantially at the level of the first tower stage as by means of hinge joints or trunnions 23 and 24, respectively, mounted on the corner posts 5 and 6 respectively. The outer ends of the leg portions 21 and 22 are connected by means of a cross-frame yoke portion 25 to form the boom structure. Preferably the leg portions 21 and 22 have an overall length such as to permit disposition of the cross frame yoke portion in a vertical plane approximating one which will extend through a movable conduit system such as the system 3 on the vessel 4. A trolley rail 26 is suspended from the cross frame yoke portion in parallel relation thereto and so as to swing freely therefrom. The yoke boom is supported for arcuate movement with respect to the plane common to the corner posts 5 and 6 by means of a cable 27 passed over the sheave 14, over a sheave 15 and through a pulley block system, designated by the numeral 16, to final connection with a hoist mechanism 17.

The trolley rail, by means of the swing joint supports designated by numerals 29 and 30, is movable arcuately with respect to the yoke boom cross frame member 25. The rail 26 in turn supports a first hoist mechanism 41 by means of a trolley 42. The hoist mechanism 41 includes a cable 43, sling hook pulley 44 and a loading beam 45 supported in substantially balanced parallel relation to the crane rail 26 as by means of a sling 46. The loading beam 45 in turn supports a series of pulleys 47 disposed in fixed, spaced relation longitudinally of the beam 45.

Preferably, the hoist mechanism 41 will be operated by air or electrical motor means controlled and actuated by means of pull chains, cables, or cords dependent therefrom, whereby to be available to personnel on board the vessel, adjacent the branch connections of the movable conduit system 3.

The numeral 51 designates a rigid boom supported on the tower second stage portion and projecting forwardly thereof beyond the plane common to the two corner posts 5 and 6. The boom 51 provides support for a second hoist mechanism 52 dependent therefrom. The hoist mechanism 52 includes a cable 53, a sling hook pulley 54, and loading beam 55, supported in substantially balanced parallel relation to the beam 45 and rail 26 as by means of a sling 56. The loading beam 55 in turn supports a series of pulleys 57 disposed in fixed, spaced relation longitudinally of the beam 55.

A third hoist mechanism 62 is supported from and fixed to structural members in the tower first stage portion. In the drawings, these structural members are not shown but will be of any conventional form. The hoist mechanism 62 includes a cable 63, a sling hook pulley 64, and loading beam 65 supported in substantially balanced parallel relation to the previously mentioned beams 55, 45 and rail 26, as by means of a sling 66. The loading beam 65 in turn supports a series of pulleys 67 disposed in fixed spaced relation longitudinally of the beam 65. Of the second and third hoist mechanisms, 52 and 62, the former is preferably operated by an air or electrical motor provided for remotely controlled operation from a location adjacent the control point for the yoke boom hoist 17. The third hoist mechanism 62 also may be provided for remotely controlled operation, but because of the limited need for operation of this hoist mechanism, its function may be performed adequately by means of a manually operated chain hoist.

A series of flexible conduits designated by the numerals 71, 72, 73 and 74 are shown in Fig. 2 to be coupled at the inner or shore ends to the several valved branch connections 2a, 2b, 2c and 2d respectively. The coupling between the inner end of each flexible conduit and a corresponding branch connection is intended to be semipermanent, and is arranged for separation only as required to replace a flexible conduit in the system. Figs. 1, 1A and 1B show the coupling of flexible conduit 74 to branch connection 2d only, as the connections 2a, 2b, and 2c and the flexible conduits 71, 72 and 73 are aligned in the same plane. In Figs. 1 and 1A, the coupling of the outer or water-side ends of the flexible conduits 71, 72, 73 and 74 to corresponding branch connections of the movable conduit system 3 is representatively indicated by the coupling of flexible conduit 74 to the valved, branch connection 3d in the movable conduit system 3.

Each of Figs. 1, 1A and 1B, also shows a means whereby the flexible conduits are each freely and dependently supported from each of the loading beams 45, 55, and 65. The means as shown includes a series of paired conduit clamps, each of which conventionally is composed of two parts and formed to provide a longitudinal hinge joint on one side and a longitudinal clamping joint diametrically opposite. In the clamp as shown in the drawings, the clamping joint provides an ear portion which extends radially from the surface of the clamp and the conduit, and is perforated to receive a coupling means such as a clevis pin.

Although only one series of clamps is illustrated in Figs. 1, 1A and 1B, each flexible conduit is provided with a similar series. Also, as specifically indicated in Fig. 2, the clamps engaged with one flexible conduit are aligned, laterally of the series of conduits, with corresponding clamps in each other series. In this way, each conduit may be supported so as to maintain substantial alignment of the conduits in a common plane, and to avoid unbalanced loads on the loading beams and the sling supports therefor. Fig. 2 shows only the outermost clamp in each of the three pairs of clamps provided for attachment to each of the flexible conduits. Fig. 2 also illustrates the clamps in end elevation, and further indicates the contemplated alignment of the clamps, and thereby the flexible conduits, for substantially balanced support of the conduits by each of the loading beams 45, 55 and 65.

In Figs. 1, 1A and 1B, the clamps which engage the flexible conduit 74 are designated in pairs beginning from the outboard end of the conduit by the numerals 101 and 102, 201 and 202, and 301 and 302. The hinge joint portion of each clamp is designated by the clamp numeral plus the letter "a," while the clamping joint portion as represented by the radial ear is designated by the clamp numeral plus the letter "b."

As shown in the views provided by Figs. 1, 1A, and 1B, the clamps are spaced one from the other in each pair, longitudinally of the conduit with which associated, and the pairs are also similarly spaced along the conduit. The spacing of one pair from another is arranged to provide for controlled flexure of the conduits primarily in the length of conduit between pairs of clamps, and this spacing will be governed by the dimension and structural characteristics of the conduits. In a typical example, a series of flexible conduits, each 50 feet long between end couplings, and with an outside diameter of 8 inches preferably would be provided with conduit clamp elements having a length one and one-half times the diameter of the conduit spaced from each other in each pair at a distance of from about three to four feet, center to center, and from pair to pair by a distance of from about 8 to 12 feet. Location of the clamps is initially determined in every instance from the outboard end of the flexible conduits. The outermost clamp of the pair at the conduit outboard end is spaced from that end so that when suspended, the flanged end of the conduit lies in a substantially vertical plane to facilitate attachment to a valved branch connection of the movable conduit system.

Suspension of the flexible conduits is accomplished by means of slings, such as are indicated in Figs. 1, 1A and 1B by the numerals 103, 203, and 303. Each sling is provided at each end with a clevis coupling designated by the numerals 104, 105, 204, 205, 304 and 305 and including clevis pins designated by the numerals 106, 107, 206, 207, 306 and 307. These slings are passed over the pulleys 47, 57 and 67 respectively dependent from the loading beams 45, 55 and 65 and the clevises at opposite ends of each sling are engaged with the radial ears provided by one pair of clamps substantially as shown in Figs. 1, 1A, and 1B. By such arrangement the slings are free to move over the pulley support therefor, and adjust to varied positions of the conduit produced by raising or lowering of the respective loading beams.

As shown in the drawings, the apparatus also includes a provision for drainage of the flexible conduits when disconnected from the movable conduit system. The means adapted for this purpose includes a drainage channel or drip pan 80, which may be continuous along the line of branch connections 2a, 2b, 2c and 2d, or may be individual receptacles adjacent each such connection. In either event, it is preferred that the drainage channel or drip pans be connected to a common drainage receiver (not shown) as by means such as the outlet conduit partially shown and designated in the drawings by the numeral 81. Drainage into the channel or drip pans is accomplished by way of valved, drain conduit connections 82, 83, 84, and 85 opening from the respective branch connections 2a, 2b, 2c, and 2d downstream from the valves therein. Preferably these drain connections are made from the valve body on the downstream side thereof, and discharge directly into the receptacle means provided.

The apparatus as illustrated may be employed for either loading or unloading a tank vessel such as indicated by the numeral 4. For the purpose of exemplifying employment of the apparatus in accordance with the inventive concept, reference is made first to Fig. 1 of the drawings. As shown in the drawing, the vessel 4 is empty. Its position, as represented, is that immediately following an unloading operation, or immediately preceding a loading operation as now contemplated. When empty, the vessel dock normally will be at a level considerably above the fixed level of the wharf and the conduit system 2 and branch connections 2a, 2b, 2c and 2d.

With the vessel in this elevated position with reference to the conduit system 2, the hoist mechanism 17 is operated to lower or raise the yoke boom so as to locate the boom cross frame portion 25 in a vertical plane approximating or common to one extended through the branch connections of the movable conduit system 3 on board the vessel 4. The hoist mechanisms 41, 52 and 62 are then operated so as to establish the outer ends of the flexible conduits, such as the conduit 74, in parallel, axially aligned relation to the corresponding branch connections of the movable conduit system, as represented by the branch connection 3d shown. The hoist mechanisms 52 and 62 are actuated so as to provide a smoothly curved conduit connection between the fixed and movable systems. The respective flexible conduit outer ends may then be coupled to the corresponding branch connections of the movable conduit system.

With the fixed and movable conduit systems 2 and 3 thus connected, by way of the flexible conduits, loading of the vessel is accomplished in the usual manner. During the loading procedure, and as the vessel displacement is increased, the level of the deck of the vessel with reference to that of the wharf and fixed conduit system is changed. At intervals, and as required to maintain the desired and indicated relationships between the movable conduit system and the outer ends of the flexible conduits, and also to control flexure of the flexible conduits within the limits imposed by their structural characteristics, the hoist mechanisms 17, 41, 52 and 62 will be operated in the manner provided.

The hoist mechanisms 17, 41, 52 and 62 are adapted for operation as required to accommodate for limited vertical and horizontal movement of the vessel and the conduit system supported thereby in planes parallel to horizontal and vertical planes common to the fixed conduit system. These mechanisms also are adapted to accommodate for limited arcuate movement of the vessel about its longitudinal and lateral axes. By means of the trolley and trolley rail support for the hoist mechanism 41, additional accommodation is provided for yawing motion of the vessel and/or for fore and aft reciprocal motion thereof within the confines of the vessel mooring lines.

When the vessel has been fully loaded, or initially during an unloading operation, operation of the several hoist mechanisms in the manner previously indicated will produce a disposition of the flexible conduits substantially as illustrated by Fig. 1A. If a loading operation has been performed, the valves in the fixed conduit system will be closed, and the liquid contained by the flexible conduits between the movable system branch connections and the uppermost portion of the arc described by the flexible conduit is allowed to pass into the movable conduit system. The valves in the movable conduit system are then closed and the flexible conduit ends uncoupled therefrom. Thereafter the several hoist mechanisms are operated to elevate the flexible conduits to a position such as is substantially illustrated by Fig. 1B.

With the flexible conduits in the elevated position illustrated by Fig. 1B, the valves in the several drain conduit connections may be opened, and the liquid previously retained by the several flexible conduits between the valves in fixed conduit system branch connections 2a, 2b, 2c, and 2d, and the lowermost limit of the flexure arc as shown in Fig. 1A drained through the drain conduits 82, 83, 84 and 85 into the drainage channel 80 or other drainage receptacles provided. Although, as should be evident, a vessel unloading operation is substantially the opposite of the operation just described, certain differences may be apparent, but do not change the basic concepts of structure and use. In such unloading operation, however, substantially complete drainage of the flexible conduits may be accomplished directly into the fixed conduit system. During the entire operation of loading or unloading, the several flexible conduits are supported and manipulated by any one of the hoist mechanisms in a common plane by means of the several loading beam supports for each group of laterally aligned clamps and their associated slings. Also, the pulley support connection between the associated loading beams and slings provide for automatic adjustment of the support means and particularly of the sling elements connected to the paired conduit clamps.

What is claimed is:

An apparatus for the common support and manipulation of a plurality of flexible conduits, each having an inner end and an outer end, wherein the inner ends of said conduits are connected in substantially horizontal coplanar relation to a first, fixed and rigid conduit system, and the outer ends are adapted for connection in substantially horizontal coplanar relation to a second conduit system movable horizontally, vertically and arcuately with reference to said first system, which apparatus comprises a plurality of conduit clamps, engaged in series relationship with each conduit and spaced longitudinally thereof, each series consisting of a first spaced pair adjacent said outer conduit end, a second spaced pair adjacent the inner end of said conduit, and a third spaced pair intermediate said first and second pairs, said plurality of conduit clamps further being disposed as parallel rows of pairs from conduit to conduit, a loop sling connected between each pair of clamps, a tower based in substantially symmetrical relation to said first conduit system, extending vertically upward therefrom and including two vertical corner posts disposed in a vertical plane adapted for substantially parallel alignment of said second conduit system therewith and forwardly thereof, a first stage portion of said tower disposed horizontally thereof at a level vertically of said tower, which level is substantially above the upper limit of vertical movement of said second conduit system, a second stage portion of said tower disposed horizontally thereof at a level vertically spaced above said first stage portion, a yoke boom which includes two parallel leg portions each having corresponding inner and outer end portions, and a cross frame yoke portion connecting the outer ends of said leg portions, a pivotal support for the inner end of each leg portion on one of said tower vertical corner posts, substantially at the level of said first stage, said supports adapted to provide for arcuate movement of said yoke portion toward and away from the plane common to said tower corner posts, forwardly thereof, a trolley rail suspended from said yoke frame portion in parallel, arcuately movable relation thereto, a first hoist mechanism suspended from said trolley rail by means of a trolley freely movable between the ends of said rail, a second hoist mechanism suspended at the level of said first tower stage portion midway of said tower corner posts and forwardly of the vertical plane common thereto, a third hoist mechanism suspended at the level of said first stage portion inwardly of the plane common to said corner posts and midway between said posts, a loading beam supported by and dependent from each of said hoist mechanisms in horizontal relatively parallel relation one to another, a series of pulleys dependent from each of said loading beams to engage and support said conduit clamp, loop slings with said first, second and third pairs of clamps supported respectively by means of said respective slings, pulleys loading beams dependent from said first, third and second hoist mechanism respectively, means, remote therefrom to actuate said hoist mechanisms, and means to raise and lower said yoke boom arcuately on said leg portion pivotal supports.

No references cited.